United States Patent [19]

Cox et al.

[11] Patent Number: 5,705,868
[45] Date of Patent: Jan. 6, 1998

[54] SPINDLE MOTOR CONNECTOR HAVING SUPPORTED ELECTRICAL LEADS

[75] Inventors: Alvin E. Cox, Yukon; Steve S. Eckerd, Oklahoma City; Gary P. Oldham, Choctaw, all of Okla.

[73] Assignee: Seagate Technology, Inc., Scotts Valley, Calif.

[21] Appl. No.: 637,500

[22] Filed: Apr. 25, 1996

[51] Int. Cl.⁶ .......................... H02K 11/00; H02K 7/14; G11B 5/16
[52] U.S. Cl. .................. 310/71; 310/40 MM; 310/67 R; 310/91; 360/98.07; 360/99.04; 360/99.08
[58] Field of Search ...................................... 310/71, 67 R, 310/40 MM, 68 R, 91; 360/98.07, 99.04, 99.08

[56] References Cited

U.S. PATENT DOCUMENTS

| | | |
|---|---|---|
| 4,858,044 | 8/1989 | Crapo . |
| 4,905,110 | 2/1990 | Krum et al. ........................ 360/99.08 |
| 4,965,686 | 10/1990 | Young et al. ........................ 360/98.07 |
| 5,015,893 | 5/1991 | Shiozawa ........................ 310/67 R |
| 5,256,922 | 10/1993 | Tanaka et al. . |
| 5,295,028 | 3/1994 | Elsing . |
| 5,352,947 | 10/1994 | MacLeod ........................ 310/67 R |
| 5,548,458 | 8/1996 | Pelstring et al. ........................ 360/99.08 |
| 5,572,384 | 11/1996 | Kumagai et al. ........................ 360/98.07 |

*Primary Examiner*—Steven L. Stephan
*Assistant Examiner*—Tran N. Nguyen
*Attorney, Agent, or Firm*—Bill D. McCarthy; Edward P. Heller, III; Randall K. McCarthy

[57] ABSTRACT

An improved spindle motor connector for a disc drive. The spindle motor connector includes a central housing having socket connectors for mating engagement with connector pins of the spindle motor. Electrical leads are connected to the socket connectors and extend radially from the central housing, and spoke arms are connected to the central housing and extend radially from the central housing adjacent the electrical leads. Spacer arms are connected to the spoke arms and maintain the desired spacing between the spindle motor connector pins and a disc drive printed wiring assembly, which is mounted below the spindle motor. The connector pins of the spindle motor are located at an end of and within the axial extent of a spindle motor stator shaft, so that the central housing extends into the end of the stator shaft. The end of the stator shaft extends through a hole in the disc drive printed wiring assembly. The spindle motor connector spans the hole in the disc drive printed wiring assembly and the distal ends of the leads of the spindle motor connector are soldered to the printed wiring assembly adjacent the spacer arms.

13 Claims, 4 Drawing Sheets

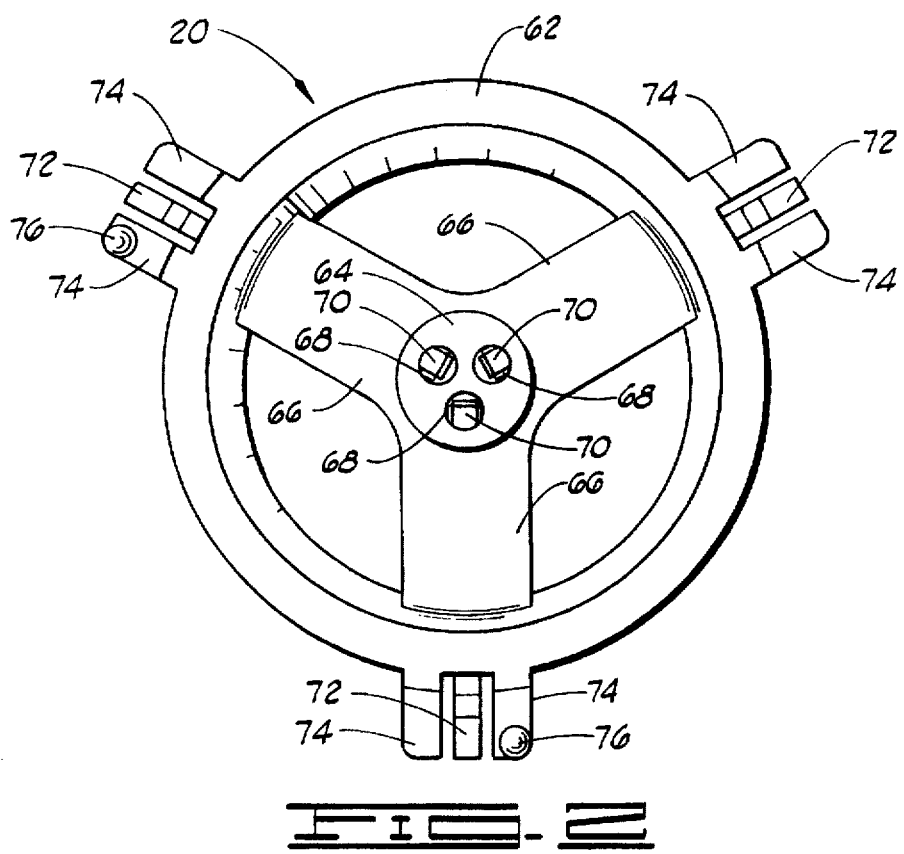
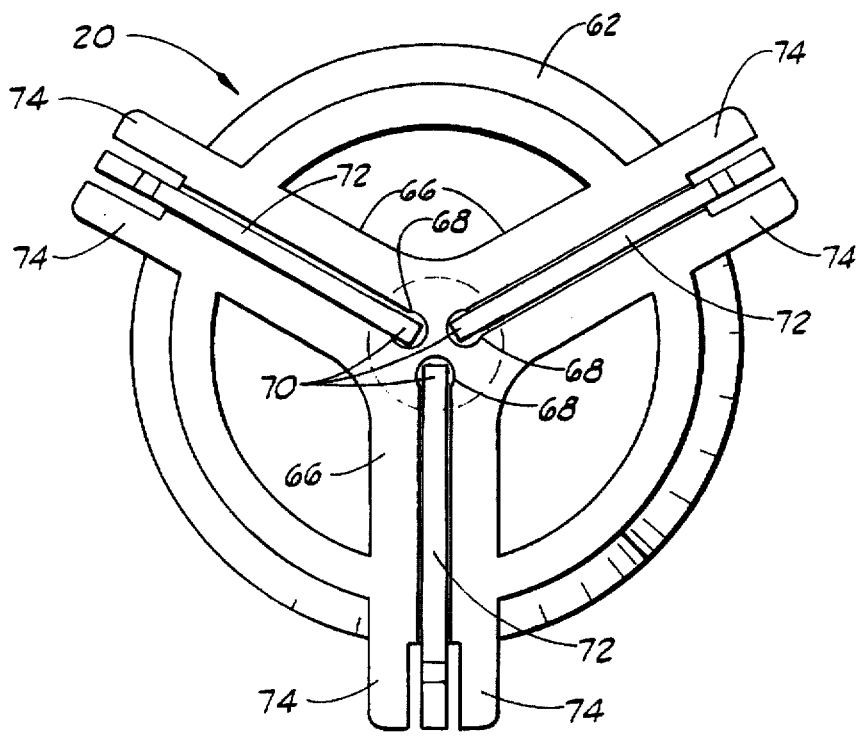
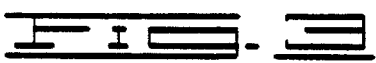

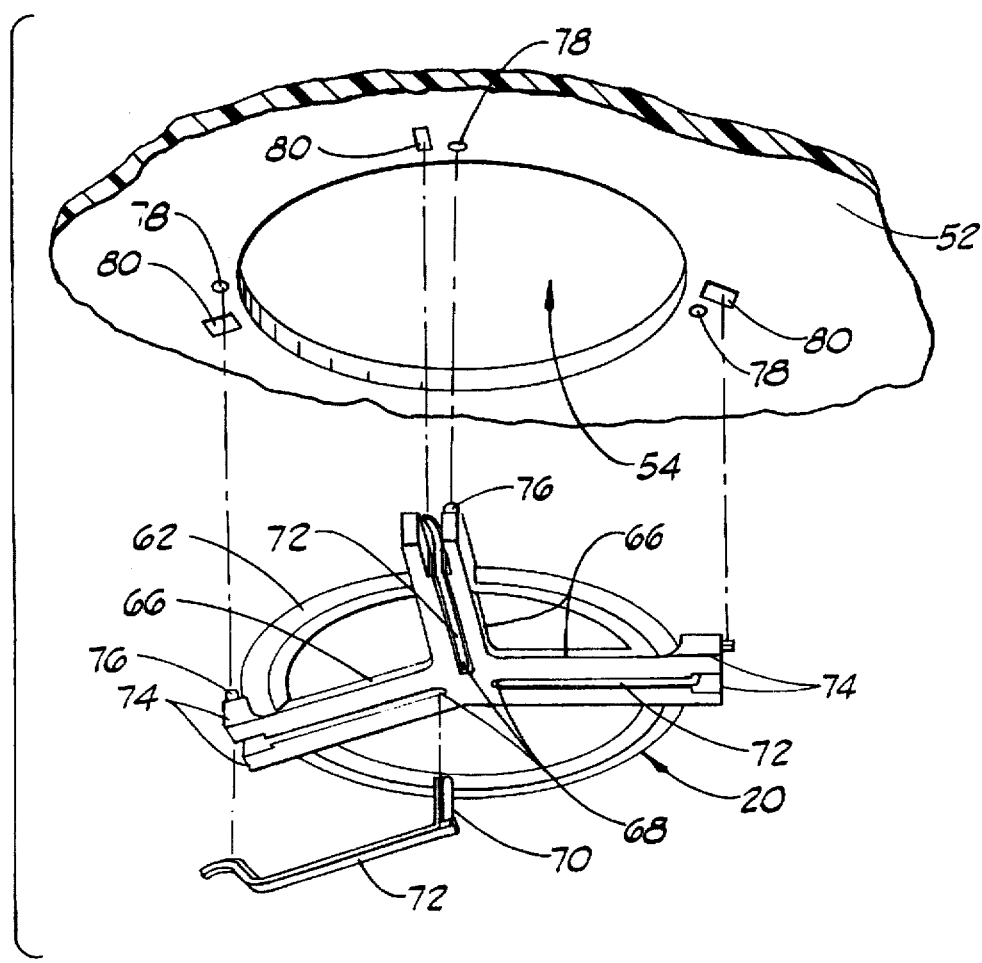
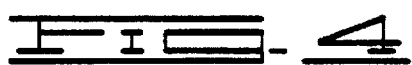
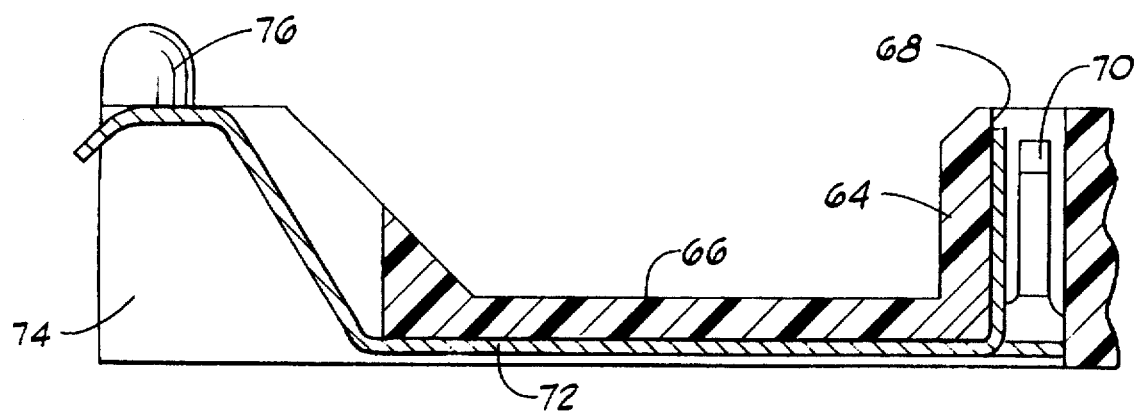
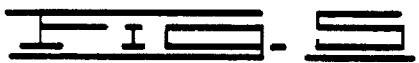

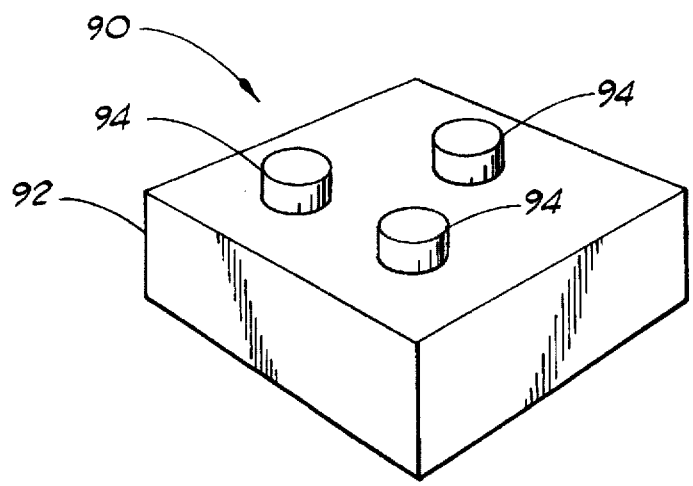
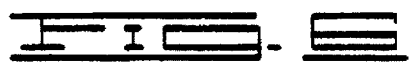
FIG. 6
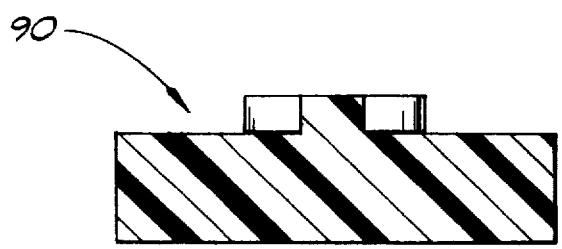
FIG. 7
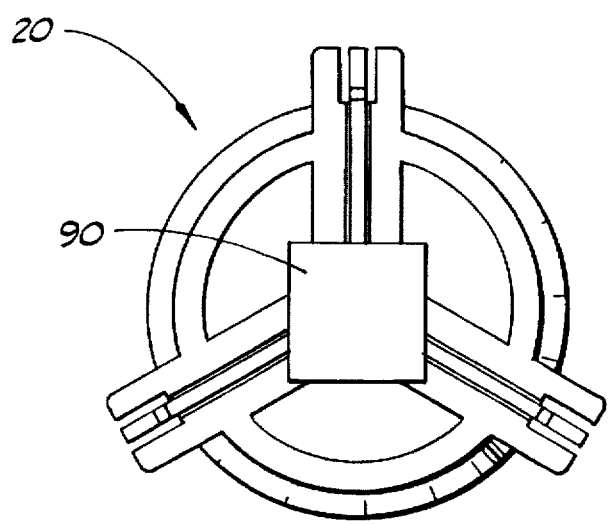
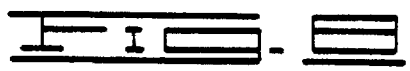
FIG. 8

SPINDLE MOTOR CONNECTOR HAVING SUPPORTED ELECTRICAL LEADS

BACKGROUND OF THE INVENTION

1. Field of the Invention

This invention relates generally to the field of disc drive data storage devices, and more particularly, but not by way of limitation, to an improved spindle motor connector in a disc drive.

2. Discussion

Modern hard disc drives comprise one or more rigid discs that are coated with a magnetizable medium and rotated at a constant high speed by a spindle motor. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from a substantially cylindrical actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of an array of permanent magnets. When controlled DC current is passed through the coil, an electromagnetic field is set up which interacts with the magnetic field of the magnets and causes the coil to move relative to the magnets in accordance with the well-known Lorentz relationship. As the coil moves, the actuator body pivots about the pivot shaft and the heads are moved across the disc surfaces.

Typically, the heads are supported over the discs by actuator slider assemblies which include air-bearing surfaces designed to interact with a thin layer of moving air generated by the rotation of the discs, so that the heads are said to "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields of the data track and converts these to a signal which is decoded by read channel circuitry of the disc drive.

The spindle motor typically comprises a brushless dc motor having a stationary stator comprising a plurality of electrical phases, each phase having one or more sets of electrical windings that are wrapped around poles within the stator, with the sets of windings in each phase being electrically connected in series. Typically, the phases are arranged in a "Y" or "Δ" configuration within the stator. The spindle motor further includes a rotor mounted for rotation about the stator, with the rotor including a plurality of permanent magnets and an outer hub to which the discs are mounted. By selectively energizing of the windings within each phase in the stator, magnetic fields are generated in the windings which interact with the magnetic fields of the rotor magnets, causing the discs to rotate in the desired direction at the desired speed.

Spindle motor driver circuitry, as well as other disc drive control circuitry is typically provided on a printed wiring assembly (PWA) mounted to the underside of the disc drive. Electrical connections are thus required between the spindle motor driver circuitry on the PWA and the phases of the spindle motor in order to control the rotation of the discs. It has been common in the prior art to include a flex circuit to provide these electrical connections; see, for example, U.S. Pat. No. 5,256,922 issued Oct. 26, 1993 to Tanaka et al. Additionally, U.S. Pat. No. 4,858,044 issued Aug. 15, 1989 to Crapo discusses various spindle motor connection configurations, including the use of flex circuits, as well as the routing of connection wires from the PWA up through a central stator shaft to the stator windings.

However, several limitations have been encountered with prior art connections to spindle motors, including the need to provide sealed paths for such connections, as sealed internal environments are required in order to maintain reliable operation of disc drives. Additionally, as disc drive data storage capacities continue to increase and disc drive internal dimensions continue to decrease, less space is available to accommodate such connections. Particularly, a flex circuit connection path requires access to the interior of the stator as well as space to accommodate connection of the flex circuit to the PWA. These and other considerations add to the manufacturing costs of stator connection configurations, both in terms of the cost of the requisite components as well as the associated costs encountered during manufacturing of the drive.

There is a need, therefore, for an improved approach to providing an electrical connection path between the spindle motor driver circuitry on a disc drive PWA and the stator of a disc drive spindle motor.

SUMMARY OF THE INVENTION

The present invention comprises an improved spindle motor connector for providing the electrical connection path between spindle motor driver circuitry and the stator phases of a disc drive spindle motor.

Particularly, the improved spindle motor connector comprises a central housing having socket connectors for mating engagement with connector pins of the spindle motor. Electrical leads are connected to the socket connectors and extend radially from the central housing. Spoke arms are connected to the central housing and extend radially from the central housing adjacent the electrical leads. Spacer arms are connected to the spoke arms and maintain the desired spacing between the spindle motor connector pins and a disc drive printed wiring assembly, which is mounted below the spindle motor.

The connector pins of the spindle motor are located at an end of a spindle motor stator shaft and within the axial extent of the stator shaft, so that the central housing extends into the end of the stator shaft when the spindle motor connector is mated with the spindle motor. The end of the stator shaft extends through a hole in the disc drive printed wiring assembly. The spindle motor connector spans the hole in the printed wiring assembly and the distal ends of the leads of the spindle motor connector are soldered to the printed wiring assembly adjacent the spacer arms.

The size of the central housing, as well as the configuration of the leads facilitates an improved current rating for the spindle motor connector over conventional prior art connectors, as the heat generated by the passage of current through the spindle motor connector is efficiently conducted and radiated by the leads.

An object of the present invention is to provide an improved electrical connection path between a disc drive spindle motor and spindle motor control circuitry.

Another object of the present invention is to provide a reliable and easily manufacturable spindle motor connection while maintaining a sealed internal environment for the disc drive.

Still another object of the present invention is to allow for further reductions in internal height requirements for the disc drive.

Yet another object of the present invention is to provide improved conduction and radiation of heat generated by the passage of current through the disc drive spindle motor connection.

Other objects, advantages and features of the present invention will be apparent from the following description when read in conjunction with the drawings and appended claims.

BRIEF DESCRIPTION OF THE DRAWINGS

FIG. 2 is a top plan view of the spindle motor connector of FIG. 1.

FIG. 3 is a bottom plan view of the spindle motor connector of FIG. 2.

FIG. 4 is a perspective, partially exploded view of the spindle motor connector and the disc drive printed wiring assembly of FIG. 1.

FIG. 5 is an elevational, cross-sectional view of a portion of the spindle motor connector of FIG. 1.

FIG. 6 is an isometric view of a pick and place cap, useful during assembly of the spindle motor connector onto the disc drive printed wiring assembly of FIG. 1.

FIG. 7 provides a cross-sectional view of the pick and place cap of FIG. 6.

FIG. 8 shows the orientation of the pick and place cap relative to the spindle motor connector of FIG. 1.

DETAILED DESCRIPTION OF THE PREFERRED EMBODIMENT

Figure 1:
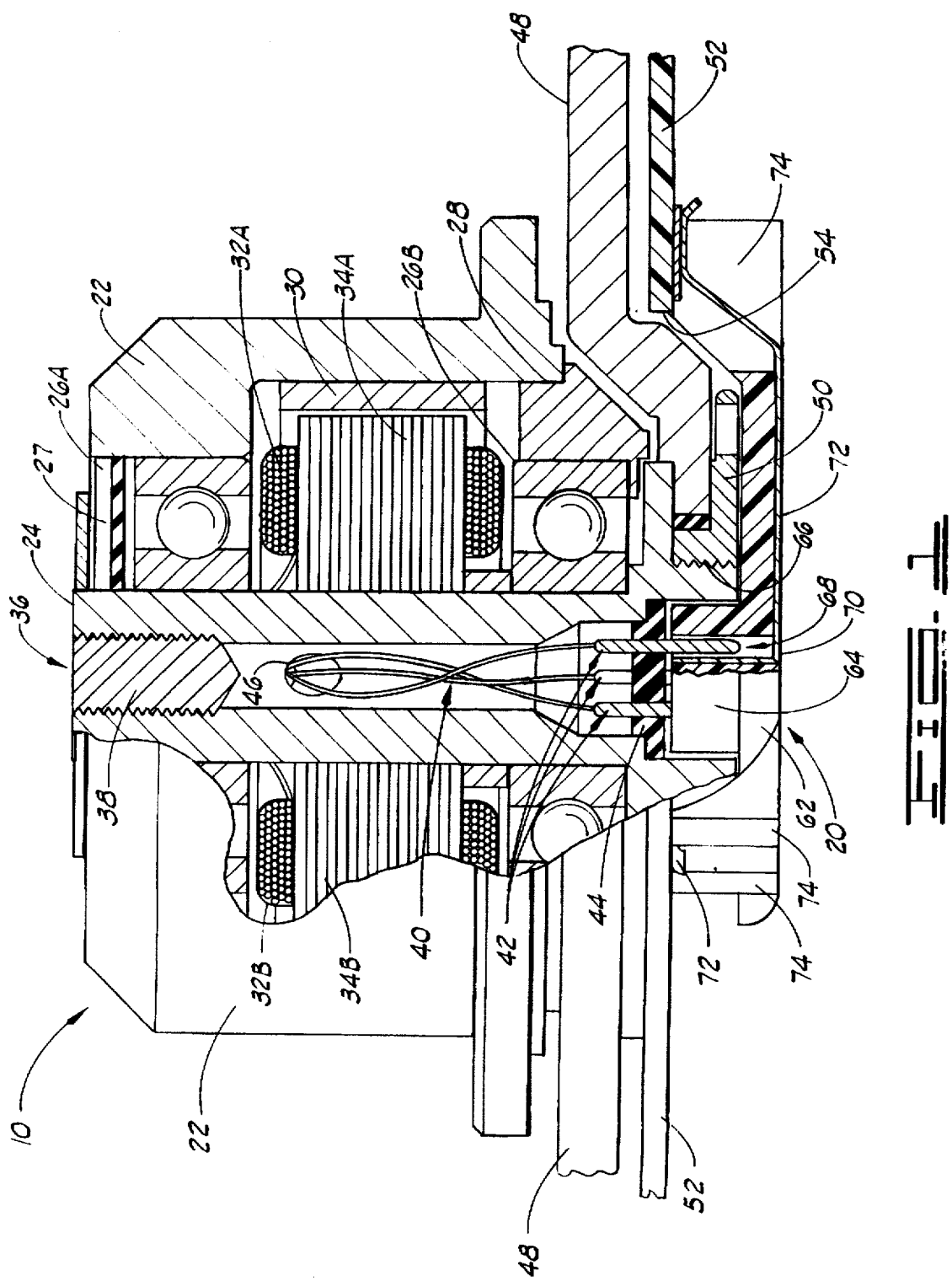
FIG. 1 is a partial cross-sectional view of a disc drive three phase spindle motor assembly including a spindle motor connector constructed in accordance with the preferred embodiment of the present invention.

Turning now to the drawings and more particularly to FIG. 1, shown therein is a partial, cross-sectional view of a disc drive three phase spindle motor assembly 10, including a spindle motor connector 20 constructed in accordance with the preferred embodiment of the present invention.

The disc drive three phase spindle motor assembly 10 (hereinafter "spindle assembly") includes a rotor hub 22 to which discs (not shown) are attached for rotation at a constant high speed. The rotor hub 22 rotates about a stationary stator shaft 24 by way of bearing assemblies 26A, 26B. A top bearing seal 27 is shown above the bearing assembly 26A and a spacer 28 provides mechanical connection and support between the bearing assembly 26B and the rotor hub 22. A plurality of permanent magnets (one shown at 30) are mounted to the rotor hub 22 for magnetic interaction with a plurality of windings (two shown at 32A, 32B) which are wound, respectively, around a plurality of laminated pole sections (two shown at 34A, 34B). The pole sections 34A, 34B are stationary and mounted to the stator shaft 24.

The stator shaft 24 includes a hollow recess 36 which incorporates threads 38 for mechanical attachment of a disc drive top cover (not shown) by way of a screw (not shown) in a conventional manner. Additionally, the hollow recess 36 provides an internal path for phase wires (collectively identified at 40) routed from the windings 32A, 32B to connector pins 42, which extend downwardly within the axial extent of the stator shaft 24 through a seal/insulator 44. Thus, the connector pins 42 provide the three phase connections to the spindle assembly 10 by way of the phase wires 40 which extend upwardly through the hollow recess 36 and out an opening 46 in the back of the stator shaft 24, as shown in FIG. 1.

The stator shaft 24 is mounted to a disc drive base plate 48 by way of a spanner nut 50. Mounted to the bottom of the base plate 48 is a disc drive printed wiring assembly (PWA) 52, providing control electronics (not shown) for the disc drive, including spindle motor control circuitry (not shown). Mounted to the PWA 52 is the spindle motor connector 20, which will be more fully described hereinbelow; however, it will be recognized that the stator shaft 24 extends downwardly through a central hole 54 in the PWA 52 and the spindle motor connector 20 spans the central hole 54 in the PWA 52 to make the necessary electrical connections between the spindle motor control circuitry of the PWA 52 and the connector pins 42. Particularly, the spindle motor connector 20 extends into the hollow recess 36 of the stator shaft 24 to mate with the connector pins 42.

Referring now to FIG. 2, shown therein is a top plan view of the spindle motor connector 20 of FIG. 1. As shown in FIG. 2, the spindle motor connector 20 preferably comprises an outer ring 62 supporting a central housing 64 by way of three spoke arms 66, all fabricated from a suitable insulating material, such as plastic. The central housing 64 extends upwardly from the spoke arms 66 for receipt into the stator shaft 24 (as shown in FIG. 1) and includes three holes 68. Each of the holes 68 houses an electrically conductive socket connector 70, with each of the socket connectors 70 mating with a corresponding connector pin 42. Both the connector pins 42 and the socket connectors 70 are known in the art.

Attached to the socket connectors 70 are electrical leads 72, which extend radially from the socket connectors 70 along the bottom sides of the spoke arms 66. This is shown in FIG. 3, which provides a bottom plan view of the spindle motor connector 20 of FIGS. 1 and 2. As shown in FIGS. 1–3, the leads 72 extend radially beyond the outer ring 62 and, as described more fully hereinbelow, are shaped for attachment to the PWA 52 by way of conventional soldering techniques.

Attached to the outer ring 62 and aligned with the spoke arms 66 are three pairs of vertical spacer arms 74, with each pair of spacer arms 74 extending outwardly from the outer ring 62 and flanking the distal portion of each of the leads 72. The top surfaces of the spacer arms 74 nominally have the same elevation as the top surface of the central housing 64 and, when the spindle motor connector 20 is installed on the PWA 52 as shown in FIG. 1, the top surfaces of the spacer arms 74 contact the top surface of the PWA 52 (it will be recognized that the PWA 52 is oriented in FIG. 1 so that the top surface of the PWA 52 is opposite the base plate 48). As shown in FIG. 2, pegs 76 extend from the top surfaces of selected spacer arms 74 for insertion into alignment holes (not shown in FIGS. 1–3) of the PWA 52. The spacer arms 74 and the pegs 76 are also fabricated from a suitable insulating material; particularly, in the preferred embodiment the outer ring 62, the central housing 64, the spoke arms 66, the spacer arms 74 and the pegs 76 of the spindle motor connector 20 are all fabricated as a single part using a suitable plastic injection molded process.

Referring now to FIG. 4, shown therein is an isometric, partially exploded view of the spindle motor connector 20 of FIGS. 1-3, illustrating the alignment of the spindle motor connector 20 with the PWA 52. For purposes of clarity, FIG. 4 shows the spindle motor connector 20 and the PWA 52 in the same orientation as shown in FIG. 1. It will be recalled that the spindle motor connector 20 mates with the top surface of the PWA 52.

As shown in FIG. 4, the top surface of the PWA 52 is provided with alignment holes 78 which receive the pegs 76 for radial alignment of the spindle motor connector 20. Particularly, it will be recognized that the spindle motor connector 20 is provided with two pegs 76, although the PWA 52 is shown to have three alignment holes 78; thus, one of the alignment holes 78 in FIG. 4 will not receive a peg 76. Additionally, the distal ends of each of the leads 72 are soldered to corresponding pads 80 on the PWA 52, as shown. Although it is contemplated that the pegs 76 could be used for mechanical support of the spindle motor connector 20 (as through the application of a suitable adhesive material such as epoxy between the pegs 76 and the alignment holes 78), in the preferred embodiment the pegs 76 do not provide mechanical support for the spindle motor connector 20, but rather are provided to facilitate the correct alignment of the distal ends of the leads 72 and the pads 80 of the PWA 52. Thus, axial mechanical support for the spindle motor connector 20 relative to the PWA 52 results from the soldering of the leads 72 to the pads 80.

Referring now to FIG. 5, shown therein is an elevational, cross-sectional view of a portion of the spindle motor connector 20, showing details relative to the configuration of the socket connector 70 and the lead 72. Particularly, as shown in FIG. 5, the lead 72 preferably extends radially beyond the spoke arm 66 before bending upwards for attachment to the corresponding pad 80 on the PWA 52 (as shown in FIG. 4). This allows a nominal amount of flexibility in the horizontal positioning of the spindle motor connector 20 relative to the connector pins 42 (as shown in FIG. 1), while at the same time providing rigid mechanical support for the spindle motor connector 20 in the axial direction.

As will be recognized, it is contemplated that the spindle motor connector 20 will be attached to the PWA 52 as part of a high-volume assembly process using efficient, automated component placement and soldering techniques. However, it will be recognized that such techniques require that the components facilitate precise registration and handling, and as shown in the drawings, the preferred embodiment of the spindle motor connector 20 is radially and axially asymmetric. Thus, for purposes of disclosure, FIG. 6 illustrates an additional, external cap 90 which can be provided with the spindle motor connector 20 in order to facilitate placement of the spindle motor connector 20 during installation on the PWA 52. It will be recognized that the cap 90 is not a part of the spindle motor connector 20, but rather is contemplated as being initially provided with each of the spindle motor connectors 20 in a tape and reel fashion to provide the necessary registration and handling surfaces required by modern efficient manufacturing processes.

As shown in FIG. 6, the cap 90 comprises a square body 92, along with attachment pegs 94 extending from a surface of the cap 90. The attachment pegs 94 are positioned and sized for insertion into the holes 68 of the central housing 64 of the spindle motor connector 20. Particularly, the cap 90 is attached to the bottom side of the spindle motor connector 20, as oriented in FIG. 3, and it is contemplated that the depth of the pegs 94 will be sufficiently sized to fit within the holes 68. Thus, when the pegs 94 are inserted into the holes 68 of the central housing 64, the body 92 of the cap 90 will be nominally flush with the central housing 64. It will be recognized that other means can readily be employed to attach the cap 90 to the spindle motor connector 20, such as the location of additional holes (not shown) elsewhere on the spindle motor connector 20 designed to mate with the pegs 94 (which would be relocated on the cap 90 as required). It is contemplated that such additional holes could be located, for example, in the spoke arms 66 adjacent the leads 72.

In the preferred embodiment, the cap 90 is constructed from a suitable material, such as plastic. FIG. 7 provides an elevational, cross-sectional view of the cap 90 of FIG. 6.

FIG. 8 provides a bottom plan view of the spindle motor connector 20 with the cap 90 of FIGS. 6 and 7 installed as provided hereinabove. As shown in FIG. 8, the cap 90 is oriented so as to be aligned with one of the spoke arms 66 of the spindle motor connecter 20. It is thus contemplated that in the preferred embodiment, the spindle motor connector 20 will be fabricated and provided with the cap 90 installed as shown in FIG. 8 for installation onto the PWA 52. Thereafter, it is explicitly contemplated that the cap 90 will be removed from the spindle motor connector 20, as the cap 90 serves no functional purpose after installation of the spindle motor connector 20 and otherwise adds undesirable height to the spindle motor connector 20 in the assembled spindle assembly 10.

It will be recognized that the preferred embodiment of the spindle assembly 10 disclosed herein includes three connector pins 42. It is expressly contemplated, however, that the spindle motor connector 20 could be configured to provide electrical connection for a different number of connector pins 42, including four connector pins, such as are commonly used with three phase spindle motors having the three phases connected in a "Y" configuration with a connection to a center tap. In such case, a different number of spoke arms 66 could readily be provided in the spindle motor connector 20. Additionally, although space has been shown between the spoke arms 66 and the outer ring 62, facilitating visual alignment of the socket connectors 70 and the connector pins 42 during assembly, the spindle motor connector 20 could be solid from the outer ring 62 to the central housing 64.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive having a base plate and a spindle motor, the spindle motor comprising a stator shaft having an end supported by the base plate and a connector pin, the disc drive further comprising a printed wiring assembly mounted below the base plate, the printed wiring assembly including a hole through which the end of the stator shaft extends, a spindle motor connector comprising:

a central housing extending into the end of the stator shaft comprising a socket connector for mating engagement with a corresponding connector pin of the spindle motor;

an electrical lead connected to the socket connector and extending radially away from the central housing; and support means, connected to the central housing and disposed below the printed wiring assembly, for supporting the electrical lead and the central housing, the support means comprising:

an outer ring;

a spoke arm extending radially from the central housing to the outer ring; and a spacer arm connected to the outer ring and disposed adjacent the electrical lead, for spacing the outer ring relative to the printed wiring assembly;

wherein the electrical lead is mechancially affixed to the printed wiring assembly to provide a current path from the printed wiring assembly to the connector pin of the spindle motor.

2. The spindle motor connector of claim 1, wherein the spindle motor comprises a plurality of connector pins, wherein the spindle motor connector comprises a plurality of corresponding socket connectors and electrical leads, and wherein each electrical lead is supported by a corresponding spoke arm.

3. The spindle motor connector of claim 1, wherein the electrical lead conducts and radiates heat away from the central housing as current is passed through the electrical lead.

4. In a disc drive of the type having a spindle assembly comprising a spindle motor having a stator and a hub mounted adjacent to the stator, the hub including a permanent magnet which magnetically interacts with magnetic fields generated from the application of time-varying current to a stator coil to cause the hub to rotate relative to the stator, the stator including a shaft having an electrical connector pin disposed at one end of the shaft, the electrical connector pin in series with the stator coil, the disc drive further comprising a printed wiring assembly mounted adjacent the spindle assembly, the printed wiring assembly including a hole through which the end of the shaft extends, the improvement comprising:

a spindle motor connector spanning the hole in the printed wiring assembly, the spindle motor connector comprising:

a central housing having an electrical socket connector for mating engagement with the electrical connector pin;

a lead extending from the electrical socket connector to the printed wiring assembly; and support means for supporting the central housing and the lead relative to the printed wiring assembly, the support means comprising:

a spoke arm; and a support arm, wherein the spoke arm extends radially from the central housing to the support arm and the support arm supports the spoke arm and the central housing relative to the printed wiring assembly.

5. The improvement of claim 4, wherein the central housing is disposed within the axial extent of the shaft and the support means is disposed below the printed wiring assembly.

6. The improvement of claim 4, wherein the electrical lead conducts and radiates heat away from the central housing as the time-varying currents are passed through the electrical lead.

7. An electrical connector for a disc drive spindle motor, comprising:

a central housing having a socket connector for mating engagement with a connector pin of the spindle motor;

an electrical lead having a proximate end and a distal end, the proximate end connected to the socket connector and the distal end extending radially from the central housing;

a spoke arm, connected to the central housing, extending radially from the central housing adjacent the electrical lead; and a spacer arm, connected to the spoke arm and adjacent the distal end of the electrical lead, for supporting the electrical connector relative to the spindle motor.

8. The electrical connector of claim 7, wherein the central housing comprises a plurality of socket connectors, and wherein the electrical connector further comprises:

a corresponding plurality of electrical leads and spoke arms extending radially from the central housing;

an outer ring connected to the plurality of spoke arms; and a corresponding plurality of spacer arms, supporting the outer ring and the plurality of spoke arms.

9. The electrical connector of claim 7, in combination with a pick and place cap having a rectangular body and a plurality of pegs for matably engaging with the central housing to facilitate automated installation of the electrical connector onto a printed wiring assembly.

10. A disc drive, comprising:

a base plate;

a spindle motor supported by the base plate, comprising:
a stator shaft; and
a rotor assembly rotatable about the stator shaft;

a printed wiring assembly supported by the base plate;

connector means for electrically connecting the spindle motor to the printed wiring assembly, the connector means comprising:

an electrical lead having a first end, a second end and a medial portion therebetween, the first end in electrical communication with the spindle motor and the second end in electrical communication with the printed wiring assembly, the electrical lead dissipating heat resulting from the passage of current through the electrical lead from the printed wiring assembly to the spindle motor;

a spoke arm disposed adjacent the medial portion of the electrical lead; and a spacer arm disposed on the printed wiring assembly adjacent the second end of the electrical lead, the spacer arm supporting the spoke arm.

11. The disc drive of claim 10, wherein the connector means further comprises an outer ring disposed between the spoke arm and the spacer arm.

12. The disc drive of claim 10, wherein the connector means further comprises a central housing supported by the spoke arm, the first end of the electrical lead disposed within the central housing.

13. The disc drive of claim 12, wherein the spindle motor further comprises an electrical wire terminating at an electrical pin, the first end of the electrical lead terminating at an electrical socket disposed within the central housing, and the electrical pin matingly engaging the electrical socket.

* * * * *